Figure 1:
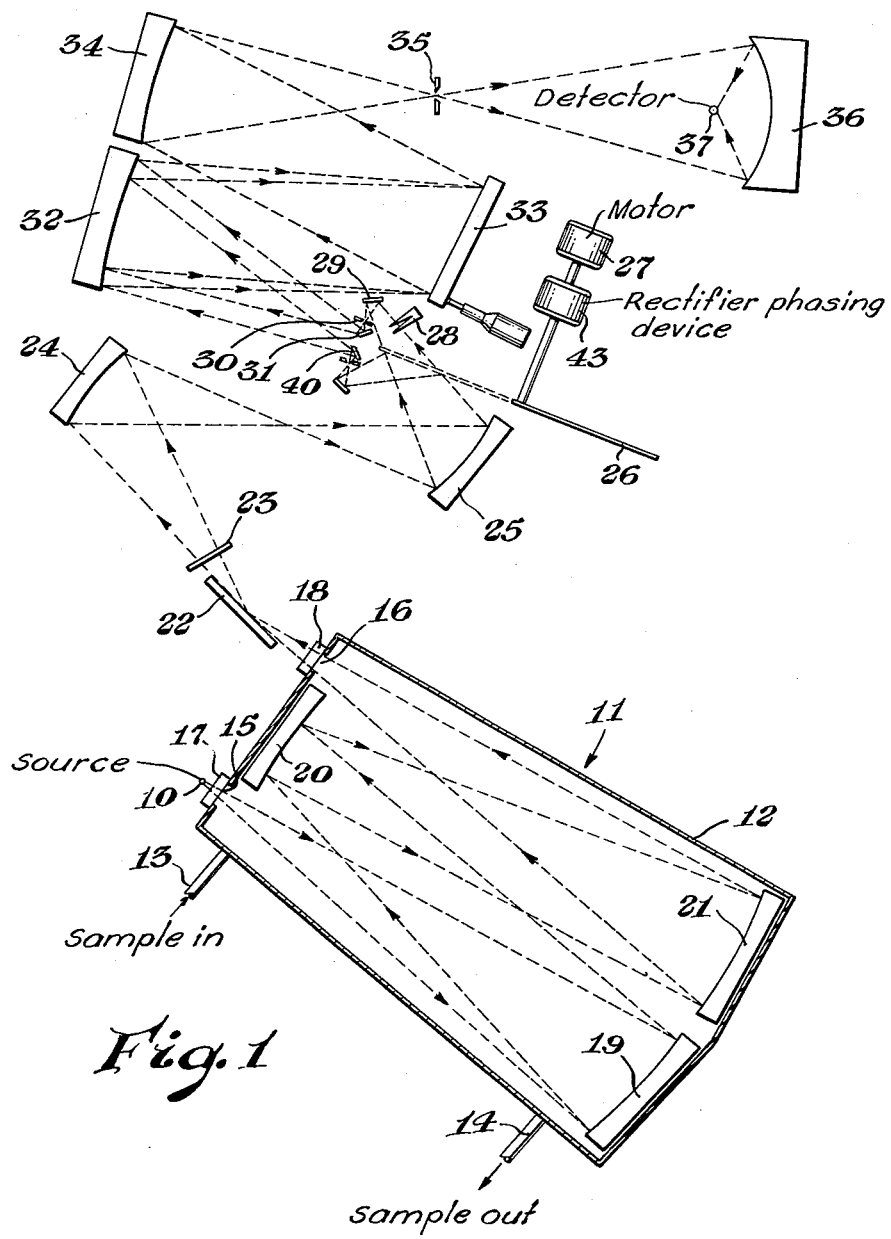

INVENTORS.
Arnold M. Bartz
Leonard W. Herscher

Nov. 23, 1965        A. M. BARTZ ETAL        3,218,914
SINGLE BEAM FREQUENCY MODULATED DISPERSIVE ANALYZER
Filed April 4, 1961                3 Sheets-Sheet 2

INVENTORS.
Arnold M. Bartz
Leonard W. Herscher
BY
Edward E. Schilling
AGENT

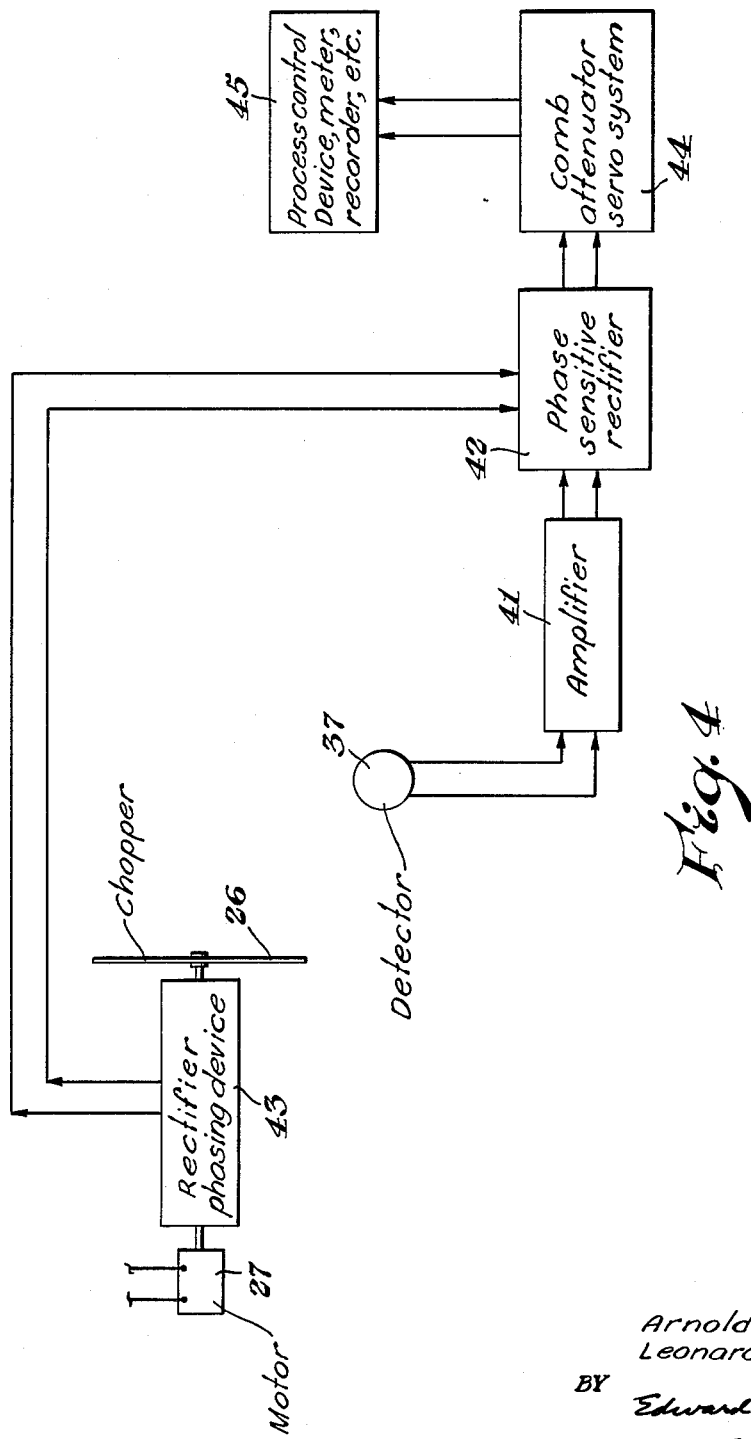

United States Patent Office 3,218,914
Patented Nov. 23, 1965

3,218,914
SINGLE BEAM FREQUENCY MODULATED
DISPERSIVE ANALYZER
Arnold M. Bartz and Leonard W. Herscher, Midland, Mich., assignors to The Dow Chemical Company, Midland, Mich., a corporation of Delaware
Filed Apr. 4, 1961, Ser. No. 100,721
3 Claims. (Cl. 88—14)

This invention relates to an improved apparatus for spectral analysis, photometry, and the like, of a mixture of radiation responsive substances, and more particularly relates to absorption spectrometry apparatus which is especially suitable for stream analysis of a mixture, the analysis involving the quantitative determination of the composition of the mixture by ascertaining the difference between or the ratio of its absorptions of energy at two selected wavelengths. This apparatus provides improved means for segregating monochromatic beams of different wavelengths from radiation from a single source and directing the segregated monochromatic beams on a single detector.

For the purposes of the specification and the appended claims, the term monochromatic radiation refers to a narrow band of consecutive wavelengths not more than about 50 reciprocal centimeters wide.

Analyzers proposed heretofore for the purpose of sampling a single beam of radiation at two different wavelengths have had the disadvantage that the beam intensity, at the sampled wavelengths, is reduced by a large fraction by the optical system before the selected beams of monochromatic radiation are brought to bear on a detector, thus limiting the response and accuracy of the instrument as well as limiting the lower levels of concentration at which a given substance may be quantitatively measured.

It is therefore a principal object of the present invention to provide novel apparatus for spectral analysis, photometry, and the like, which overcomes the difficulties and limitations in prior apparatus for sampling a single beam of radiation at two different wavelengths.

These and other objects and advantages of the present invention are attained by the novel assembly of parts including, in combination, a single source, a single detector, and a monochromator having dispersing means as a component part and means for alternately directing radiation from the source upon the dispersing means at different angles of incidence. The component parts and the arrangement thereof are hereinafter more fully described.

The improved apparatus includes means in the form of a chopper, for cyclically passing the entire beam of radiation from a single source along a normal (undeviated) optical path while alternately interrupting the radiation and deviating the entire beam along another optical path. The deviated and undeviated radiation is focused upon respective entrance slits and then is directed upon a single element for dispersing the radiation. The dispersed radiation is reflected from a single collimating mirror along an optical path through a single exit slit whereby two different wavelengths of radiation are sampled, and passes to a detector. The deviated and undeviated radiation fall upon the detector alternately and the signals produced by the detector are then utilized in an optical nulling radiation comparison system in the usual manner. As the detector receives the full intensity of a monochromatic portion of the radiation during each half cycle of the alternation the amount of spectral energy provided for excitation of the detector is substantially increased over that provided by prior apparatus thus providing for better instrument performance.

Figure 2:
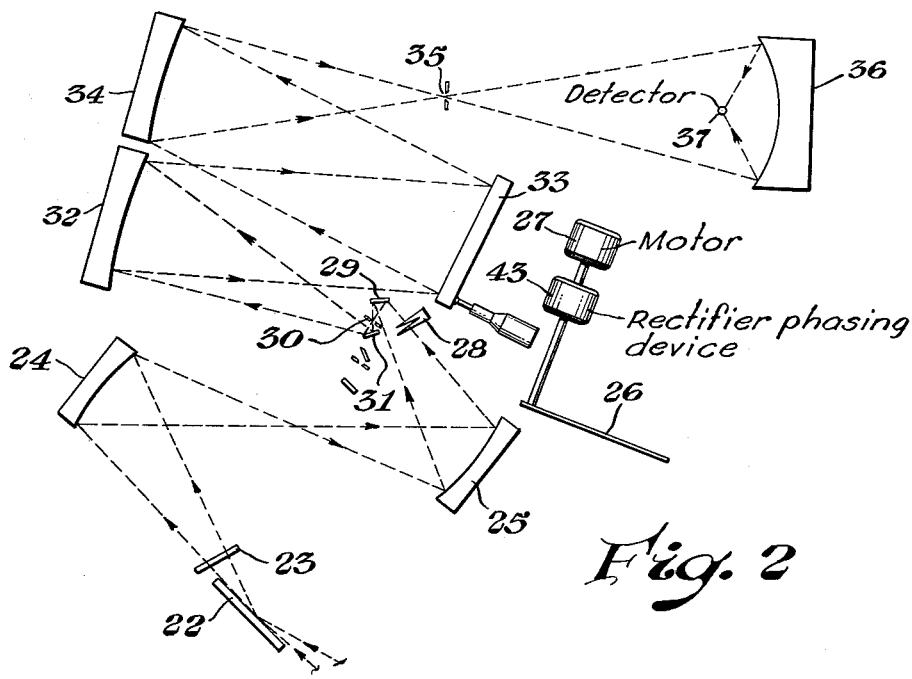
Figure 3:
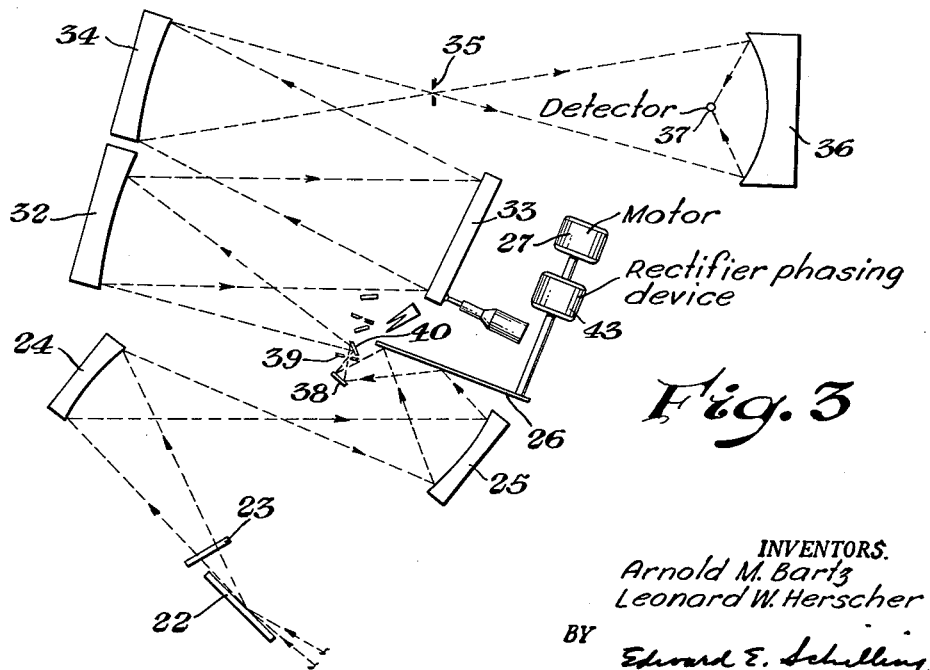

The advantages and features of the present invention will be better understood upon becoming familiar with the following description, reference being had to the appended drawings in which like numerals identify like parts, and in which, FIG. 1 is a diagrammatic plan view of one form of the apparatus showing the radiation source, a sample cell, and both the deviated and undeviated optical paths, FIG. 2 is a diagrammatic plan view of a part of the new apparatus showing the optical path followed by undeviated radiation, FIG. 3 is a similar diagrammatic plan view of a part of the new apparatus showing the chopper in the optical path and the resulting optical path followed by deviated radiation, and FIG. 4 is a schematic arrangement of parts of an apparatus for utilizing the output of the detector.

While an absorption spectrometer embodying the apparatus of the invention may be employed in different forms for examination of a sample by radiation of different kinds, the apparatus shown is adapted for, and will be particularly described with reference to, spectral analysis by means of infrared radiation.

The apparatus shown in FIG. 1, includes a source 10 emitting infrared radiation, including the two wavelengths to be used for analytical purposes. The source may be any of the kinds commonly used, e.g., a Nichrome wire, a Nernst glower or a piece of silicon carbide heated by the passage of electric current therethrough.

Radiation from the source 10 is directed through a sample cell indicated generally by the numeral 11. While any type of sample cell suitable for general infrared analysis may be used, the particular cell illustrated in section is a long path gas cell. This type of gas cell is well known in the art and consists of a gas impervious envelope 12 generally of metal, a gas inlet 13 and a gas outlet 14 which may communicate with a gas stream for continuous stream analysis, two apertures 15 and 16 totally covered or enclosed by infrared transmitting windows 17 and 18, e.g., windows of NaCl or KBr, sealed to the envelope 12 and three spherical mirrors 19, 20 and 21, by which the radiation is made to traverse the length of the cell four or more times.

As shown, the radiation enters the cell 11 through the salt window 17, traverses the cell to the mirror 19, thence to the mirror 20, to the mirror 21, and then out through the salt window 18. The radiation leaving the cell 11 is reflected from a plane mirror 22. If space requirements permit, the sample cell and the source may be positioned, if desired, so that radiation leaving the cell is directed along the path indicated for radiation reflected from the plane mirror 22, thereby obviating the use of the plane mirror.

For the purposes of the present description with reference to infrared analysis it will be understood that all mirrors are metallized on the surface facing incident radiation.

The beam of radiation then passes through a radiation filter 23 (which may be of silver chloride coated with silver sulfide) which stops short wavelength radiation, i.e., near infrared, visible and ultraviolet radiation, portions of which would not subsequently be rejected from the optical path by the dispersing element.

Radiation passing the filter 23 falls on the spherical mirror 24, is directed to the spherical mirror 25, and from there is directed towards the chopping means 26, which consists of a rotatable semicircular mirror, or chopper. The chopping means 26 is positioned so that when it is rotated by electric motor 27, the beam of radiation leaving the spherical mirror 25 is alternately passed and reflected by the semicircular mirror, i.e., the radiation is undeviated, or deviated, at this point. While the chopper 26 is shown mounted on the same shaft as motor 27 for simplicity of illustration, it will be understood that the chopper and motor may be on separate shafts with a belt, chain or gear drive connection between the shafts.

The undeviated path will be more fully understood with reference to both FIG. 2 and FIG. 1.

The undeviated radiation passing the chopping means 26, e.g., as shown in FIG. 2, passes around or through the comb attenuator 28, falls upon the small plane mirror 29 and is focused upon the entrance slit 30. Radiation passing the entrance slit 30 falls upon the small plane mirror 31, is directed to the collimating mirror 32, whence it is directed to the dispersing means 33, usually consisting of a diffraction grating rather than a prism, and provided with means for adjusting the angle of incidence of radiation thereto.

The radiation leaving the diffraction grating 33 is dispersed so that only a substantially monochromatic portion of the radiation is reflected from the collimating mirror 34 passes through the exit slit 35. Radiation passing the exit slit 35 falls on the ellipsoidal mirror 36 and is focused thereby on the detector 37. The detector 37 may be a pin thermocouple or a lead sulfide cell or a bolometer, or the like, as well understood in the art.

The collimating mirrors 32 and 34, may be either spherical or parabolic mirrors, as desired. However, spherical mirrors are to be preferred since they are less expensive, and being used in pairs in this system, tend to compensate out spherical aberrations, making the use of parabolic reflectors unnecessary.

The path of the deviated radiation will be more fully understood with reference to both FIG. 3 and FIG. 1. When the chopping means 26 is in the position shown in FIG. 3 (and in dotted outline in FIG. 1), radiation leaving the spherical mirror 25 is reflected from the chopper mirror to the small plane mirror 38, is focused upon the entrance slit 39, falls upon a second small plane mirror 40, and is directed to the collimating mirror 32, whence it is directed to the dispersing means 33. Again only a monochromatic portion of the radiation dispersed by the dispersing means 33 and reflected by the collimating mirror 34 passes through, i.e., is selected by, the exit slit 35. Radiation passing the exit slit 35 falls on the ellipsoidal mirror 36 and is focused on the detector 37.

The deviated and undeviated paths from spherical mirror 25 to collimating mirror 32 thus constitute alternate segments of a part of the path of the radiation through the spectrometer.

Referring more particularly to FIG. 1 in which both the deviated and undeviated optical paths are shown, it may be seen that the radiation reflected from the small plane mirror 40, and the radiation reflected from the small plane mirror 31, each fall upon the collimating mirror 32 with a different angle of incidence. The two beams also fall, respectively, upon the dispersing means 33 at different angles of incidence. The collimating mirror 34 is then illuminated by diffracted radiation which is alternately displaced as to the wavelength region collected by a given part of the mirror. As a consequence, the exit slit 35 is illuminated alternately by first, a monochromatic portion of one beam, and then, a monochromatic portion of different wavelength from the other beam. Only monochromatic portions of desired, i.e., preselected, respective wavelengths are passed by the exit slit 35.

The signals produced by the detonator 37 are then utilized in the usual manner. As indicated schematically in FIG. 4, the output of the detector 37 is amplified in amplifier 41 and fed to a phase sensitive rectifier 42, which also receives the output of a rectifier phasing device 43, which is driven at the same rate as the chopper mirror by virtue of both the switching element of the rectifier phasing device 43 and the chopper 26 utilizing the same shaft.

The alternate signals produced by the detector 37 may vary in amplitude, depending upon the transmission of the sample at the two monitored wavelengths. When the alternate signals vary, the output of the phase sensitive rectifier 42 is a measure of the difference between the alternate signals. The output of the rectifier 42 is fed to the comb attenuator servo system 44 and used to operate the optical comb attenuator 28 which is located "behind" the chopper 26 and intercepts the undeviated radiation as required. The comb attenuator 28 moves in response to the amplified output of the rectifier 42 to balance the intensity of the radiation at the two wavelengths falling upon the detector 37, resulting in a null output by the rectifier 42. The movement of the comb attenuator resulting in a null output of the recifier is a function of the ratio of the energies of radiation transmitted by the sample at the two selected wavelengths. The movements of the comb attenuator may be transmitted electrically or mechanically, with or without amplification as required, to a process control device, a suitable meter, a recorder, etc. 45, as desired.

While the apparatus shown and described specifically includes a gas cell for purposes of illustration, it will be understood that any type of sample cell, with suitable windows which transmit the desired radiation, may be employed provided the cell is positioned so that radiation transmitted thereby is directed along the optical path described.

The sample cell may also be positioned, if desired, along the optical path at other locations than the one specifically illustrated in the drawings. Thus, if the sample cell construction and size permit, the cell may be located between spherical mirrors 24 and 25 where the beam is sufficiently focused or condensed to pass through ordinary-sized cell windows and apertures, or the sample cell may be positioned close to the exit slit 35 between the exit slit 35 and the ellipsoidal mirror 36. The latter position is often of advantage in analyzing liquid samples, especially samples containing rather volatile solvents, as liquid samples are heated less by monochromatic radiation than by an undispersed beam, and there is less tendency for either the solvent to boil or for densiy changes to take place in the sample.

It will also be understood that while the instrument in the form shown is intended for use in the infrared field and the collimating and focusing elements are mirrors, and the dispersing means or element is preferably a diffraction grating, the instrument may be readily employed with visible and ultraviolet radiation. For use in the visible field the collimating, focusing and dispersing elements may be front surface mirrors or glass lenses. For use in the ultraviolet field the collimating, focusing and dispersing elements may be front surface mirrors or quartz lenses. The detector and the source used will depend on the kind of radiation employed as well understood in the art.

In using the present instrument for a given analysis the instrument is adjusted so as to select substantially monochromatic radiation at the analytical wavelengths. Each wavelength adjustment is made by changing the position of the appropriate entrance slit, as well as the dispersing means, as required, thereby changing the angle of incidence of the passed beam as it falls on the dispersing means. As a consequence of this change, a different portion of the spectrum of the beam passing the entrance slit illuminates the exit slit and is passed to the detector. Ordinarily the entrance slit in the undeviated path is adjusted so as to select radiation at a reference wavelength, e.g., at the base of a major absorption peak, or at a peak of an interfering absorber, as understood in the art.

As an example of the use of the instrument of the invention for the determination of $NO_2$ in a gas stream containing water vapor, the entrance slit in the deviated path is set to select monochromatic ratiation at a wavelength of 6.2 microns, which is the location of both $NO_2$ and water vapor absorption bands. The entrance slit in the undeviated path is adjusted to select monochromatic radiation at a wavelength of 5.5 microns, which is the location of a water vapor absorption band of very nearly the same intensity as the water vapor band at 6.2 microns. The so-adjusted instrument, when employed with a gas cell having an optical path 4 meters in length, readily exhibits a span of 100 p.p.m. $NO_2$ full scale on the recorder with less than 1 percent noise using presently available amplifier components.

Among the advantages of the apparatus of the present invention is the larger signal to noise ratio which is possible because the entire beam intensity is used at both selected wavelengths.

The apparatus of the invention having been thus fully described obvious modifications thereof will be apparent to those skilled in the art and the scope of the invention is to be considered limited only by the appended claims.

We claim:

1. In an improved apparatus for segregating, from radiation from a single source, monochromatic beams differing in wavelength: a single detector; a monochromator receiving radiation along a single common path from the source; said monochromator including: (1) single common dispersing means, (2) alternate directing means, within the monochromator and separate from the dispersing means, positioned to receive the radiation from the source along said single common path and to direct the radiation to the dispersing means along two alternately used paths, whereby radiation is alternately and cyclically directed at the dispersing means at first and second preselected angles of incidence, said alternate directing means including essentially rotating reflective chopping means disposed at an effective position, relative to the remainder of the alternate directing means, to periodically and alternately interrupt the radiation received along said single common path and to transmit the radiation to the dispersing means along the two respective alternately used paths, (3) and means for selecting, from radiation leaving the dispersing means, monochromatic beams of radiation alternately differing in wavelength, such means comprising sequentially a reflecting mirror receiving radiation from the dispersing means at a constant angle and a single common exit slit receiving radiation from said reflecting mirror; and means for causing the selected monochromatic beams to fall upon the detector.

2. The improved apparatus as in claim 1 in which the dispersing means is a diffraction grating.

3. Improved apparatus suitable for use in absorption spectrometery which comprises: a radiation source; a detector producing a signal in response to radiation falling thereon; transmitting means for transmitting radiation from the source to the detector via a single sample cell, said transmitting means including a rotating chopper having a closed reflecting sector and an open sector, focusing and directing mirrors, entrance slits, a single common dispersing means, and a single common exit slit; the transmitting means being disposed so that radiation directed from the source to the rotating chopper is directed by the rotating chopper along first and second alternately and cyclically used, separated paths from the chopper to a first directing mirror which directs radiation at the dispersing means, each alternately used path between said rotating chopper and said first directing mirror being defined by directing elements exclusive to such path; said first alternately used path being defined sequentially in the order in which radiation falls on the directing elements by the reflecting sector of the rotating chopper, a first small plane mirror, a first entrance slit, a second plane mirror and said first directing mirror; said second alternately used path being defined sequentially in the order in which radiation falls on the directing elements by the open sector of said rotating chopper, a third small plane mirror, a second entrance slit, a fourth plane mirror and said first directing mirror; the directing elements in each of said alternately used paths being disposed so as to bring radiation to the dispersing means at differing angles of incidence, radiation from said first path being brought at a first preselected angle of incidence, and radiation from said second path being brought at a second preselected angle of incidence; and the transmitting means from the first directing mirror to the detector being disposed so that radiation is directed by directing elements along a single common path, said single common path being defined sequentially in the order in which radiation falls on the directing elements by the single common dispersing means, a second directing mirror, the single common exit slit, a focusing mirror, and the detector.

References Cited by the Examiner

UNITED STATES PATENTS

| | | | |
|---|---|---|---|
| 2,439,373 | 4/1948 | Stearns | 88—14 |
| 2,648,249 | 8/1953 | Canada | 88—14 |
| 2,849,618 | 8/1958 | Smith | 250—43.5 |
| 2,936,732 | 5/1960 | Ring et al. | 88—14 |
| 2,970,216 | 1/1961 | Magraph | 250—43.5 |
| 3,137,757 | 6/1964 | Martin et al. | 88—14 |

JEWELL H. PEDERSEN, *Primary Examiner.*

ARTHUR GAUSS, *Examiner.*